United States Patent
Cairns et al.

(10) Patent No.: US 8,964,912 B2
(45) Date of Patent: Feb. 24, 2015

(54) ADAPTIVE TIMING RECOVERY VIA GENERALIZED RAKE RECEPTION

(75) Inventors: Douglas A. Cairns, Durham, NC (US); Gregory E. Bottomley, Cary, NC (US); Yi-Pin Eric Wang, Cary, NC (US)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 3036 days.

(21) Appl. No.: 11/219,183

(22) Filed: Sep. 2, 2005

(65) Prior Publication Data

US 2006/0268962 A1 Nov. 30, 2006

Related U.S. Application Data

(60) Provisional application No. 60/686,015, filed on May 31, 2005.

(51) Int. Cl.
  *H04B 1/10* (2006.01)
  *H04B 1/712* (2011.01)
  *H04B 1/7117* (2011.01)

(52) U.S. Cl.
  CPC .............. *H04B 1/712* (2013.01); *H04B 1/7117* (2013.01); *H04B 2201/709727* (2013.01)
  USPC ........... 375/347; 375/142; 375/144; 375/148; 375/150

(58) Field of Classification Search
  CPC ................. H04B 1/712; H04B 1/7117; H04B 2201/709727
  USPC ................... 375/347, 343, 147, 148, 150, 152
  See application file for complete search history.

(56) References Cited

U.S. PATENT DOCUMENTS

| | | | |
|---|---|---|---|
| 6,314,130 B1 | 11/2001 | Smolyar et al. | |
| 6,363,104 B1 | 3/2002 | Bottomley | |

(Continued)

FOREIGN PATENT DOCUMENTS

| | | |
|---|---|---|
| JP | H11168448 A | 6/1999 |
| JP | H11261440 A | 9/1999 |

(Continued)

OTHER PUBLICATIONS

Cairns, D. et. al., "Low Complexity Parameter Estimation for the Generalized Rake Receiver." 2004 IEEE 11th Digital Signal Processing Workshop & IEEE Signal Processing Education Workshop. Aug. 1-4, 2004. pp. 191-195.

(Continued)

*Primary Examiner* — Shuwang Liu
*Assistant Examiner* — David S Huang
(74) *Attorney, Agent, or Firm* — Coats and Bennett, PLLC

(57) ABSTRACT

A method and apparatus for determining operating modes in a receiver is described herein. A delay searcher in the receiver detects a signal image in the received signal. When the receiver is a RAKE receiver, a plurality of RAKE fingers coherently combine time-shifted versions of the received signal at different delays. Alternatively, when the receiver is a chip equalization receiver, an FIR filter coherently pre-combines the signal images in the received signal. A processor determines delays. In particular, the processor generates a first signal quality metric for a single-delay receiver mode, and generates a second signal quality metric for a multi-delay receiver mode. Based on a comparison of the first and second signal quality metrics, the processor selects the single-delay or the multi-delay receiver mode for processing the signal image.

48 Claims, 11 Drawing Sheets

(56) References Cited

U.S. PATENT DOCUMENTS

| | | | |
|---|---|---|---|
| 6,408,039 B1 | 6/2002 | Ito | |
| 6,618,434 B2 | 9/2003 | Heidari-Bateni et al. | |
| 6,721,373 B1* | 4/2004 | Frenkel et al. | 375/346 |
| 6,839,378 B1 | 1/2005 | Sourour et al. | |
| 7,082,174 B1* | 7/2006 | Smee et al. | 375/349 |
| 2001/0028677 A1* | 10/2001 | Wang et al. | 375/148 |
| 2002/0141486 A1 | 10/2002 | Bottomley et al. | |
| 2004/0240531 A1* | 12/2004 | Black et al. | 375/148 |
| 2005/0047485 A1 | 3/2005 | Khayrallah et al. | |
| 2006/0007990 A1 | 1/2006 | Cozzo et al. | |
| 2006/0182204 A1 | 8/2006 | Cairns et al. | |

FOREIGN PATENT DOCUMENTS

| | | |
|---|---|---|
| JP | 2002217781 A | 8/2002 |
| JP | 2003273773 A | 9/2003 |
| JP | 2004080339 A | 3/2004 |
| JP | 2004533176 A | 10/2004 |
| WO | 2005022769 A1 | 3/2005 |

OTHER PUBLICATIONS

Bottomley, G. et. al., "A Generalized Rake Receiver for DS-CDMA Systems." 2000 IEEE 51$^{st}$ Vehicular Technology Conference Proceedings on May 15-18, 2000 in Toyko, Japan and New York, New York. May 15, 2000. pp. 941-945. vol. 2 of 3.

Wang, Yi-Pin and Bottomley, G., "Generalized RAKE Reception for Canceling Interference from Multiple Base Stations." 2000 Vehicular Technology Conference on Sep. 24-28, 2000 in Piscataway, New Jersey. Sep. 24, 2000. pp. 2333-2339. vol. 5.

Grant, Stephan J., et. al., "Generalized RAKE Receivers for MIMO Systems." IEEE Vehicular Technology Conference, Oct. 6-9, 2003, pp. 424-428.

Fulghum, Tracy, et. al., "Low Complexity Parameter Estimation for the Multi-antenna Generalized Rake Receiver." IEEE 63rd Vehicular Technology Conference, Spring 2006, pp. 1874-1878.

Frederick K.H. Lee and Peter J. McLane, "Design of Nonuniformly-Spaced Tapped-Delay-Line Equalizers for Sparse Multipath," IEEE Global Telecomm. Conf. (Globecom), San Antonio, TX, Nov. 25-29, 2001, pp. 1336-1343.

Hafez Hadinejad-Mahram, "On the Equivalence of Linear MMSE Chip-Level Equalizer and Generalized RAKE," IEEE Communications Letters, vol. 8, No. 1, Jan. 2004, pp. 7-8.

C. Cozzo, G. Bottomley, and A. Khayrallah, "Rake Receiver Finger Placement for Realistic Channels," Proc. IEEE Wireless Communications and Networking Conference (WCNC), Atlanta, GA, Mar. 21-25, 2004, pp. 316-321.

G.E. Bottomley, E. Sourour, R. Ramesh, and S. Chennakeshu, "Optimizing the performance of limited complexity Rake receivers," Proc. 48$^{th}$ IEEE Veh. Technol. Conf., Ottawa, Canada, May 18-21, 1998, pp. 968-972.

E. Sourour, G.E. Bottomley, and R. Ramesh, "Direct Sequence Spread Spectrum Acquisition with Sample Accumulation in Fading Channels," VTC'99, pp. 2198-2202.

E. Sourour, G. Bottomley, and R. Ramesh, "Delay Tracking for Direct Sequence Spread Spectrum Systems in Multipath Fading Channels." 1999 IEEE, pp. 422-426.

M. Lattva-aho, M. Juntti, and I. Oppermann, "Reconfigurable Adaptive RAKE Receiver for Wideband CDMA Systems," 1998 IEEE, pp. 1740-1744.

Co-pending U.S. Appl. No. 11/935,840, filed Nov. 7, 2007.

Torres, Juan A., Official Action dated May 9, 2011, for U.S. Appl. No. 12/111,526, filed Apr. 29, 2008.

* cited by examiner

ADAPTIVE TIMING RECOVERY VIA GENERALIZED RAKE RECEPTION

This application claims priority benefit under 35 U.S.C. 119(e) from the U.S. provisional application Ser. No. 60/686, 015, filed on 31 May 2005, and entitled "Adaptive Timing Recovery Via Generalized Rake Reception," which is incorporated in its entirety by reference herein.

BACKGROUND OF THE INVENTION

The present invention relates generally to RAKE receivers for code division multiple access (CDMA) systems, and more particularly, to a method and apparatus for determining the finger placement of RAKE fingers in a RAKE receiver.

In a wireless communication system, a transmitted signal may travel through multiple propagation paths so that the received signal is a composite of multiple time-shifted versions of the signal. The different time-shifted versions of the received signal, referred to herein as signal images, suffer from different phase and attenuation effects. The multiple time-shifted signal images combine at the receiver in an unpredictable manner resulting in signal fading.

CDMA receivers typically employ a RAKE receiver to combat signal fading due to multi-path propagation. The goal of the RAKE receiver is to detect the individual signal images and combine them coherently. A RAKE receiver typically includes a plurality of correlators, sometimes referred to as fingers, to separately despread different time-shifted signal images, and a combiner to combine the correlator outputs. For example, a RAKE receiver may detect and combine the M strongest signal images. A delay searcher processes the received signal to identify the delays corresponding to the strongest signal images, and a finger placement processor determines the finger placement based on those delays. The process of finger placement comprises the assignment of a delay to each RAKE finger to align the RAKE finger in time with a signal image. A simple finger placement strategy is to assign the delays of the J strongest signal images found by the delay searcher to respective RAKE fingers.

Typically, finger placement starts by generating an estimated power delay profile (PDP) over a defined search window that gives the signal power as a function of delay. An exemplary PDP is shown in FIG. 1. The delay searcher measures the signal power of the received signal samples. The spacing between samples defines a search grid and the signal power measurements define the PDP. One approach to finger placement, referred to herein as the "peak" approach, is to place fingers at or near the peaks or local maximas in the PDP. Ideally, the RAKE fingers would be placed at the exact delays corresponding to peaks in the PDP. As shown in FIG. 1, exact placement of the RAKE fingers at the peaks of the PDP is not always possible because the search grid does not always align with the peaks in the PDP. The actual peak in the PDP may fall between the grid points of the search grid.

The alignment of the search grid with the actual channel delay(s) affects performance. To illustrate this point, consider a simple flat (one-tap) channel. Upon reception of such a signal, a CDMA receiver attempts to correlate a time-shifted version of the spreading code with the received signal. The time-shift (delay), given by the searcher, is a function of the search grid resolution. If the grid is aligned with the channel delay, the contribution of all other codes is orthogonal, so there is no interference. If the grid is not aligned with the channel delay, then the orthogonality property is lost, and the contribution of other codes shows up as interference. The impact of misalignment on performance can be dramatic at very high data rates when higher order modulation such as 16-QAM is employed, as this modulation is highly sensitive to self-interference. Thus, when the path delay falls between two sampling intervals, the performance degradation can be severe. Consequently, data throughput may fluctuate between high data rates when the finger delays assigned to the RAKE fingers correspond to the path delays of the signal images, and much lower data rates when the finger delays assigned to the RAKE fingers do not align with the path delays.

SUMMARY OF THE INVENTION

The present invention relates to a method for determining operating modes in a receiver. Generally, the method comprises identifying a signal image in a signal received by the receiver using a delay searcher. A processor in the receiver then determines first and second quality metrics expected for a single-delay receiver mode and a multi-delay receiver mode, respectively. The processor then selects either the single-delay or multi-delay receiver mode based on a comparison of the first and second quality metrics. When the single-delay receiver mode is selected, the receiver processes the signal image using a single delay. When the multi-delay receiver mode is selected, the receiver processes the signal image using multiple delays.

In one embodiment, the receiver comprises a RAKE receiver, where the present invention relates to a method for determining finger placement and weighting coefficients in the RAKE receiver. According to this exemplary embodiment, a delay searcher is configured to identify a signal image in a received signal and a finger placement processor is configured to select either a single-finger receiver mode or a multi-finger receiver mode. A finger placement processor is configured to generate first and second signal quality metrics for the single-finger receiver mode and multi-finger receiver mode, respectively, and to select the receiver mode that produces the best metric. The selection of a receiver mode may be performed for all detected signal images in a received signal, or only for selected signal images. For example, selection of the receiver mode may be performed only for the strongest signal image, or for all signal images meeting a predetermined criterion, such as a signal strength criterion. The mode selection may be selectively enabled and disabled. For example, mode selections may be enabled only for non-dispersive channels containing a single signal image, and disabled for dispersive channels containing more than one signal image. In other embodiments, other criterion may be considered. For example, mode selections may be enabled only for selected modulation schemes and data rates.

In another embodiment, the receiver comprises a chip equalization receiver. For chip equalization receivers, a filter with J taps is configured to filter the received signal. The number of filter taps and the delay assigned to each filter tap is determined adaptively based on evaluation of a signal quality metric.

DETAILED DESCRIPTION OF THE INVENTION

The present invention relates to a method and apparatus for determining finger placement in a RAKE receiver or chip equalization receiver. As used herein, the term RAKE receiver includes a generalized RAKE (G-RAKE) receiver as described in U.S. Pat. No. 6,363,104, which is incorporated herein by reference. The invention has application in single-input single-output (SISO) receivers, multiple-input, single-output (MISO) receivers, and multiple-input, multiple-output (MIMO) receivers.

Figure 2:
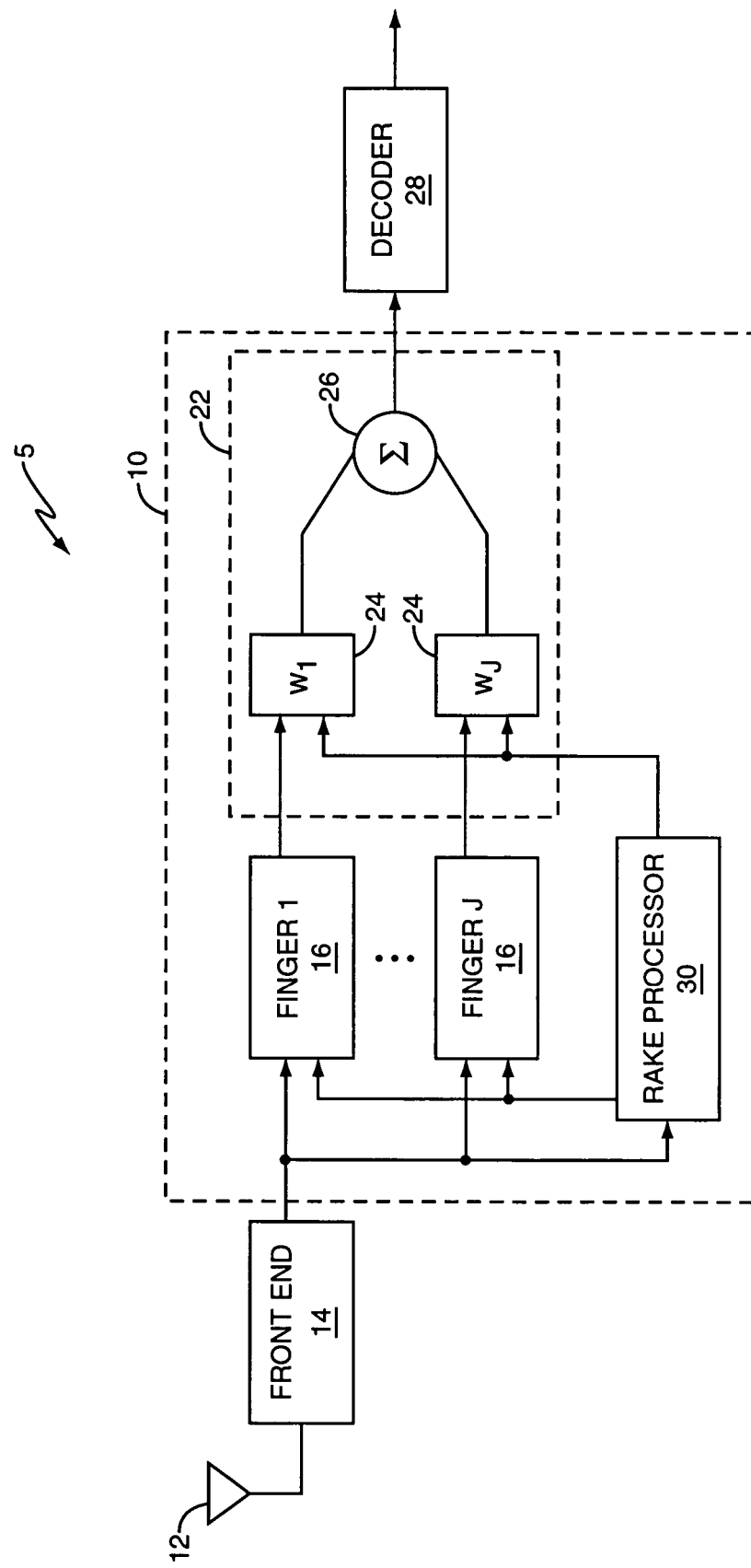
FIG. 2 illustrates a wireless receiver including a RAKE receiver according to one exemplary embodiment of the invention.
Figure 3:
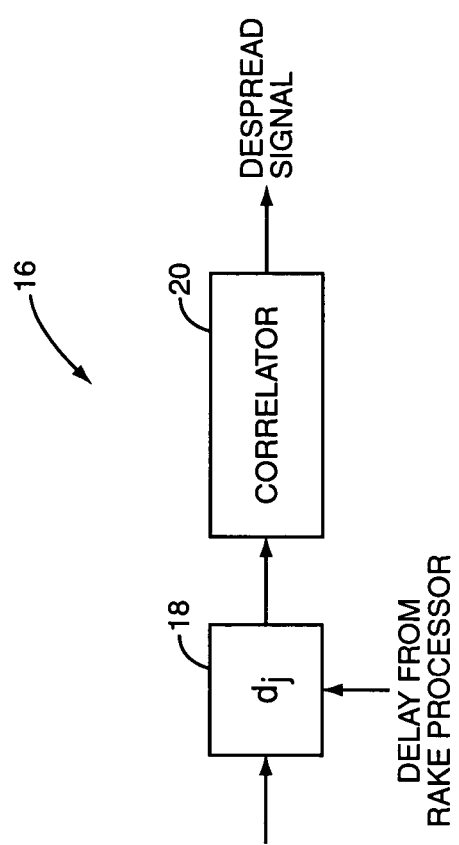
FIG. 3 illustrates a RAKE finger for a RAKE receiver.

FIG. 2 illustrates a wireless receiver 5 including a RAKE receiver 10 according to one exemplary embodiment of the invention. The wireless receiver 5 comprises a receive antenna 12, a receiver front-end 14, a RAKE receiver 10, and a decoder 28. RAKE receiver 10 comprises a RAKE processor 30, a plurality of RAKE fingers 16 to detect respective signal images in a multi-path signal and a weighting network 22 to combine the outputs of the RAKE fingers 16 to generate a combined RAKE output signal. Decoder 28 decodes the combined RAKE output signal. Receiver front-end 14 filters, down-converts, and samples the received signal from antenna 12 to generate a baseband signal for processing. The sampling interval may, for example, be one-half the chip period $T_c$. The signal samples from the receiver front-end 14 are input to one or more RAKE fingers 16, whose function is to despread the selected signal images, typically the L strongest signal images. As seen in FIG. 3 each RAKE finger 16 comprises a delay element 18 and a correlator 20. The delay element 18 aligns finger 16 with a selected signal image by delaying the received signal by a configurable delay determined by the RAKE processor 30. The correlator 20 correlates the delayed signal with a known spreading sequence associated with a desired signal to despread the received signal. As a result of the correlation process, unwanted signals contained in the received signal appear as noise to the receiver. Weighting network 22 weights and combines the despread signals output from the individual RAKE fingers 16. Weighting elements 24 apply a weighting coefficient to respective RAKE finger outputs and RAKE combiner 26 combines the weighted RAKE output signals to generate a combined decision statistic, referred to herein as the RAKE output signal. The RAKE output signal is applied to a decoder 28, which decodes the RAKE output signal to generate an estimate of the originally transmitted signal.

Figure 1:
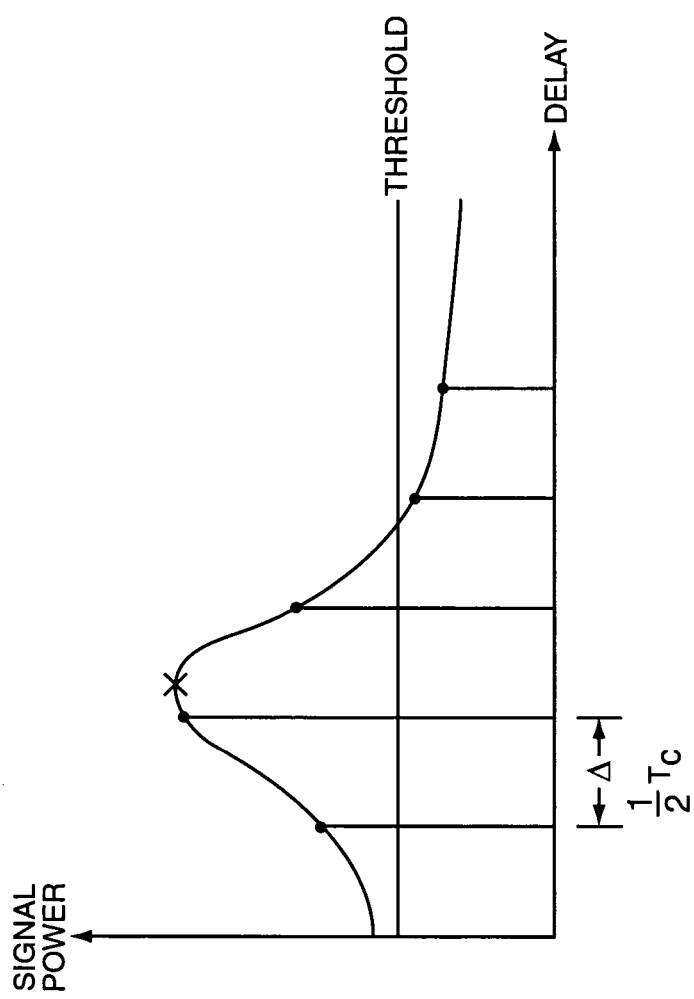
FIG. 1 illustrates an exemplary power delay profile used by a path searcher of a RAKE receiver to identify signal images in a received composite signal.
Figure 4:
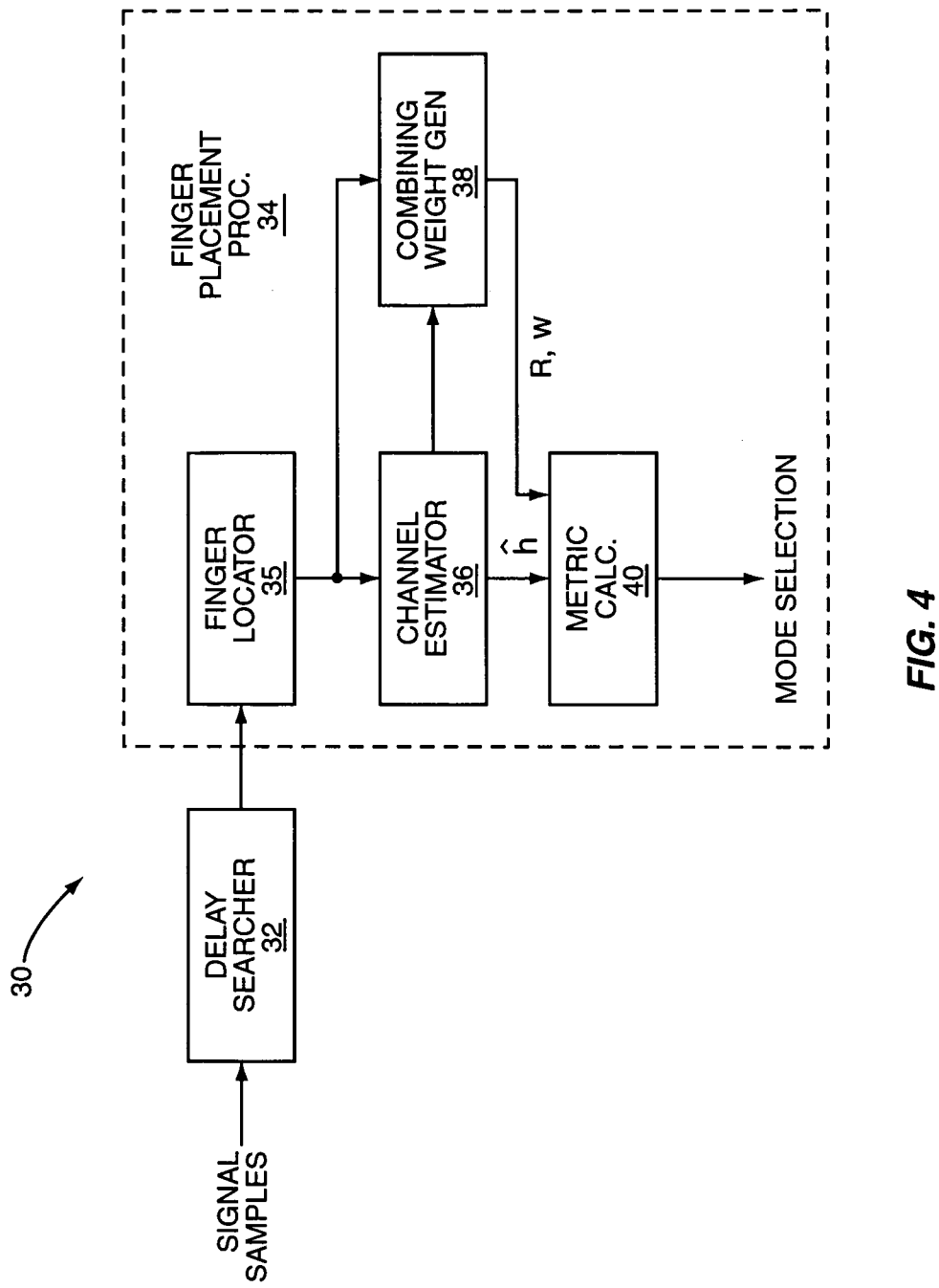
FIG. 4 illustrates a RAKE processor.

RAKE processor 30 determines the number and placement of the RAKE fingers 16, and the combining weights applied to the individual RAKE finger outputs. FIG. 4 illustrates a RAKE processor according to one exemplary embodiment of the invention. RAKE processor 30 comprises a delay searcher 32 and finger placement processor 34. The delay searcher 32 identifies the individual signal images in a received signal and determines the delay associated with each signal image. More particularly, the delay searcher 32 generates a power delay profile, such as shown in FIG. 1, by measuring the signal power of the received signal samples over a predetermined search window. The sampling interval may be one chip period or less. FIG. 1 illustrates a power delay profile assuming a one-half chip interval between signal samples. One approach to detecting the signal images is to detect local maxima in the PDP and compare the local maxima to a defined threshold. The delays of these local maximas are taken as the path delays of the signal images in the received multi-path signal. The path delays of the detected signal images are input to the finger placement processor 34. The finger placement processor 34 determines the number and placement of RAKE fingers 16 based on the path delay estimates provided by the delay searcher 32. Additionally, the finger placement processor 34 calculates weighting coefficients to be applied to the individual RAKE finger outputs.

The finger placement processor 34 includes a finger locator 35, channel estimator 36 combining weight generator 38, and metric calculator 40. The finger locator 35 determines the locations of the RAKE fingers 16 based on the estimated path delays reported by the path searcher 32. In a conventional RAKE receiver, a RAKE finger 16 is typically assigned to the L strongest delays. In a G-RAKE receiver, additional RAKE fingers 16 may be used to detect the received signals that do not correspond to any path delay. The channel estimator 36 generates estimates of the propagation channel from the transmitter to the receiver for each assigned RAKE finger 16. The channel estimates are provided to the combining weight generator 38. Combining weight generator 38 computes the combining weights applied to the RAKE finger outputs. The combining weight generator 38 may, for example, compute combining weights based on a maximal ratio combining (MRC) criteria. For MRC combining, the combining weights are based upon the signal power or signal power to interference power ratio (SIR) at the output of the correlator 20 for each RAKE finger. If the signal SIR for a particular RAKE finger 16 is low, it will be assigned a low weighting factor. Conversely, if the signal SIR for a particular RAKE finger 16 is high, it will be assigned a large weighting factor. With full G-RAKE combining, the combining weight generator 38 computes impairment correlations across the RAKE fingers 16 and generates an impairment covariance matrix R. The combining weight generator 38 multiplies the vector of channel estimates ĥ from the channel estimator 36 by the inverse of the impairment covariance matrix R to generate a weight vector w whose elements are the weighting factors for the outputs of RAKE fingers 16.

In some circumstances, the delay searcher 32 may detect a dominant signal image in the received signal. This situation may occur, for example, when there is a direct line-of-sight path between the transmitter and the receiver. A dominant signal image will exist if there is only one detected signal image indicating a non-dispersive channel. If the channel is dispersive and more than one signal image is detected, the presence of a dominant signal image may be determined based on the relative signal power or SIR of the detected signal images. If the signal power or SIR of the strongest signal image exceeds all others by a predetermined amount, then a dominant signal image may be deemed to exist.

When a dominant signal image exists, reception may be improved by using an adaptive finger placement algorithm that selects a receiver mode based on a signal quality metric. When the search grid or delay estimation grid is not aligned with the path delay of the dominant signal image, reception is improved by placing multiple RAKE fingers proximate the peak in the PDP. In this case, combining the output of the multiple RAKE fingers performs a form of interpolation. The end result approximates a single RAKE finger placed at the path delay. When the search grid aligns with the path delay so that the peak in the PDP is at or very close to the path delay, the use of additional RAKE fingers 16 is unnecessary.

According to one aspect of the present invention, finger placement processor 34 adaptively determines the number of RAKE fingers combined to create an estimate of the transmitted symbol or related statistic as in 16-QAM. This process is referred to herein as mode selection. Finger placement processor 34 evaluates a signal quality metric assuming various finger placement strategies or receiver modes. A first signal quality metric, referred to herein as the single-finger metric, is determined for a single-finger receiver mode using a single RAKE finger 16 placed at the peak in the estimated PDP. A second signal quality metric, referred to herein as the multi-finger metric, is determined for a multi-finger receiver mode using multiple RAKE fingers 16 placed proximate the peak in the estimated PDP. In one embodiment, the multi-finger metric is computed based on three equally spaced RAKE fingers 16, centered on the peak in the estimated PDP. The finger spacing is typically a multiple of the sample spacing. In this case, the sample grid is used as a finger placement grid. However, those skilled in the art will recognize that the finger placement grid may be different from the sample grid. In any case, the spacing between RAKE fingers 16 should be less than the Nyquist criteria. Based on the metric evaluation, the finger placement processor 34 selects one of a single-finger receiver mode or multi-finger receiver mode.

The present invention may also be used to select between the single-finger receiver mode and two or more multi-finger receiver modes. For example, a three-finger metric and a five-finger metric may be determined in addition to a single finger-metric. Additionally, various channel conditions may be considered for each multi-finger receiver mode by assuming different path delays.

Figure 5:
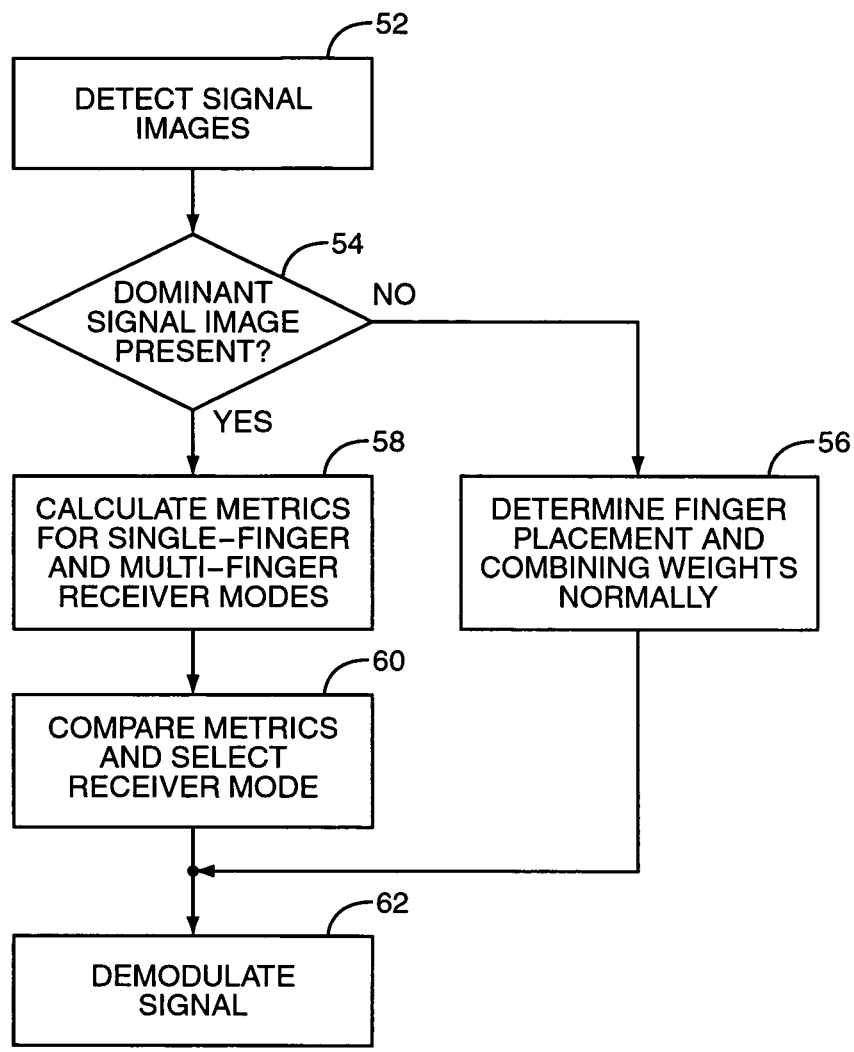
FIG. 5 is a flow chart illustrating an exemplary mode selection procedure according to the present invention.

FIG. 5 illustrates an exemplary procedure for determining finger placement in a RAKE receiver 10. The delay searcher 32 detects signal images in the received signal (block 52) and determines whether a dominant signal image is present (block 54). If there are multiple signal images and no dominant signal image, finger placement may be performed in a conventional fashion (block 56). If a dominant signal image is present, which will be the case when only one signal image is present, finger placement processor 34 selects a receiver mode, e.g., single-finger or multi-finger. To determine the receiver mode, the finger placement processor 34 computes an estimated signal-to-interference ratio (SIR) or other signal quality metric for both a single-finger receiver mode and multi-finger receiver mode (block 58). The finger placement processor 34 then selects the receiver mode (block 60) by comparing the computed SIR for the single finger and multi-finger modes and selecting the mode that maximizes the SIR. The selected receiver mode is used to demodulate the received signal (block 62).

Any known technique for estimating the SIR in a RAKE receiver may be employed. For example, in a combining receiver, the SIR may be estimated by:

$$SIR = \frac{|w^H \hat{h}|^2}{w^H R w}, \quad (1.1)$$

where w is the combining weight vector (scalar), $\hat{h}$ is the estimated net response vector (scalar), and R is the estimated impairment covariance matrix (scalar). The combining weight w used to compute the SIR may be a tentative combining weight. The combining weights w used to combine the RAKE finger outputs may be based on more accurate information and differ from those used to calculate the SIR.

The first step in determining the SIR is to determine the finger placement. For the single-finger receiver mode, the finger delay for the RAKE finger 16 is located at the delay reported by the delay searcher 32. For the multi-finger receiver mode, the desired number J (typically an odd number) of RAKE fingers 16 may be centered at the delay corresponding to the peak in the PDP reported by the path searcher 32. The finger spacing Δ should meet Nyquist criteria (Δ<0.8 chips for WCDMA). Assuming three RAKE fingers 16 as an example, the finger placement processor 34 may place one of the fingers at delay $d_1$ corresponding to the peak in the PDP. The remaining two fingers could be placed respectively at a predetermined offset Δ before and after $d_1$. The offset Δ may, for example, be ¾ chip or ½ chip. As a general rule, if there are an odd number J of RAKE fingers 16, then (J−1)/2 fingers 16 are placed at increments of +Δ from the center finger and (J−1)/2 fingers 16 are placed at increments of −Δ from the center finger. After the finger placement is determined, the finger placement processor 34 computes the combining weight vector w, net response vector $\hat{h}$, and impairment covariance matrix R.

Methods for computing the combining weight vector w, net response vector $\hat{h}$, and impairment covariance matrix R are well known in the art and are therefore only briefly summarized herein. Given the net response vector $\hat{h}$ and impairment covariance matrix R for the RAKE fingers 16, the combining weight vector w may be computed according to:

$$w = R^{-1}\hat{h} \quad (1.2)$$

The net response vector $\hat{h}$ may be estimated by the channel estimator 36 from the despread pilot symbols. The net response vector $\hat{h}$ comprises a vector of length J whose elements comprise the channel coefficients for all J RAKE fingers 16. The net response vector $\hat{h}$ at slot index j is given by:

$$\hat{h}(j) = \frac{1}{N_p} \sum_{m=0}^{N_p-1} x(m,j) s^*(m), \quad (1.3)$$

where x(m,j) is the vector of despread pilot symbols for the $m^{th}$ symbol in the $j^{th}$ slot, s(m) is the known pilot symbol transmitted at time index m, and $N_p$ is the number of pilot samples over which the channel is estimated.

Equation (1.3) gives a noisy estimate of the net channel response at each RAKE finger 16. A more accurate estimate of the net response vector $\hat{h}$ may be computed by taking the pulse shape into account. First a net response vector $\hat{h}$ is calculated for J finger delays according to Equation (1.3). Then, L path delays are considered, where L is less than or equal to J. The L path delays may be estimated as hereinafter described. A medium response vector $\hat{g}$ for each estimated path delay is computed given by:

$$\hat{g} = (A^H A)^{-1} A^H \hat{h}, \quad (1.4)$$

where A is a pulse shape autocorrelation matrix giving the autocorrelation of the pulse shape at the estimated path delays. The {i, j}th element in A, which is a J×L matrix, is given by the autocorrelation function $r_{ff}(d_i - \tau_j)$ where $d_i$ is the finger delay and $\tau_j$ is the estimated path delay. From the medium response vector $\hat{g}$, an effective net response vector $\tilde{h}$ for J G-RAKE fingers 16 may be generated according to:

$$\tilde{h} = B\hat{g}, \quad (1.5)$$

where B is a pulse shape autocorrelation matrix using the autocorrelation of the pulse shape. Note that the number J of RAKE fingers 16 may be different than the number L of estimated path delays. The $\{j,l\}$th element in B, which is a J×L matrix, is given by the autocorrelation function $r_{ff}(d_j-\tau_l)$ where $d_j$ is the finger delay and $\tau_l$ is the estimated path delay. The effective net response vector $\tilde{h}$ may be used in place of $\hat{h}$ for G-RAKE receiver calculations.

An estimate $\hat{R}$ of the impairment covariance matrix R may be computed from the net response vector $\hat{h}$. The impairment covariance matrix R may alternatively be computed from the effective net response vector $\tilde{h}$. An estimated impairment covariance matrix $\hat{R}$ may be computed from the net response vector $\hat{h}$ according to:

$$\hat{R}(k) = \frac{1}{N_p - 1} \sum_{m=0}^{N_p-1} \left(x(m,k)s^*(m) - \hat{h}(k)\right)\left(x(m,k)s^*(m) - \hat{h}(k)\right)^H. \quad (1.6)$$

The estimated impairment covariance matrix $\hat{R}$ computed according to Equation (1.6) may be used to compute the combining weights w and SIR according to Equations (1.2) and (1.1), respectively. Alternatively, a filtered version of the estimated covariance matrix, computed according to $\bar{R}(k)=\gamma \bar{R}(k-1)+(1-\gamma)\hat{R}(k)$, where $\gamma=(0.99)^{N_p}$, may be used to compute the combining weights and SIR according to Equations (1.2) and (1.1), respectively.

A parametric approach as described in U.S. patent application Ser. No. 10/800,167 filed Mar. 12, 2004 and/or in U.S. Patent Application No. 60/685,825 filed 31 May 2005, may also be used to calculate impairment correlations. These applications are incorporated herein by reference. Using the parametric approach, the impairment covariance matrix R is computed according to:

$$R = \alpha R_I + \beta R_N, \quad (1.7)$$

where $R_I$ is an interference correlation matrix representing interference correlation due to multi-user interference, $R_N$ is the noise correlation matrix representing noise correlations across RAKE fingers 16, and the parameters α and β are fitting parameters. Parameter α0 represents the ratio of total base station power to pilot channel power, while β represents the power of white noise that models background noise plus unmodeled interference (inter-cell and perhaps inter-system GSM/EDGE). The fitting parameters α and β are unknown, but may be estimated by finding the least squares solution to:

$$\hat{R} = \alpha R_I + \beta R_N \quad (1.8)$$

The fitting parameters α and β may be instantaneous values or filtered values, and may be computed on a per symbol basis, per slot basis, or per frame basis. Once the fitting parameters α and β are known, the impairment correlation matrix R is computed according to Equation (1.7). The $\{i,j\}$th element of the interference correlation matrix is given by:

$$R_I(i,j) = \sum_{l=0}^{L-1} \sum_{q=0}^{L-1} g_l g_q^* \sum_{\substack{n=-\infty \\ n \neq 0}}^{n=\infty} r_{ff}(d_i - nT_c - \tau_l) r_{ff}^*(d_j - nT_c - \tau_q), \quad (1.9)$$

where $g_l$ and $g_q$ are the lth and qth elements of a medium response vector $\hat{g}$ given by Equation (1.4), $d_i$ and $d_j$ are the finger delays, $\tau_l$ and $\tau_q$ are the path delays, $r_{ff}(t)$ is the autocorrelation function of the receive filter, and $T_c$ is the chip period. The $\{i,j\}$th element of the noise correlation matrix is given by $$R_N(i,j) = r_{ff}(d_i - d_j) \quad (1.10)$$

Figure 6:
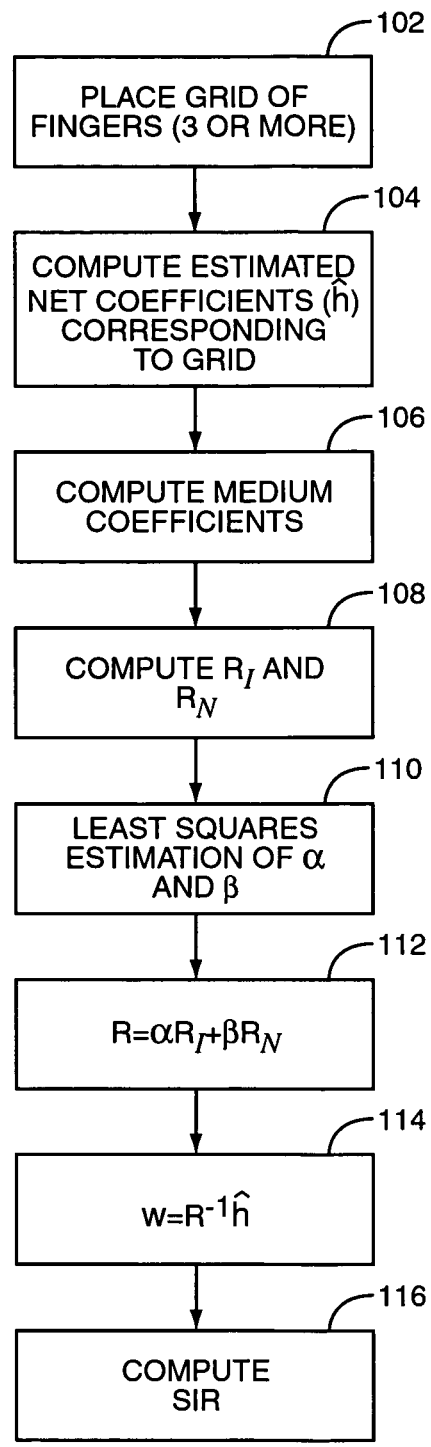
FIG. 6 is a flow chart illustrating an exemplary method of computing a signal quality metric.

FIG. 6 illustrates an exemplary method of computing the SIR where the combining weights are calculated using the parametric approach. First, finger locator 35 determines the finger delays based on the peak reported by the delay searcher 32 (block 102). Channel estimator 36 estimates the channel, computes the net response vector $\hat{h}$ according to Equation (1.3) (block 104), and then computes a medium response vector $\hat{g}$ according to Equation (1.4) (block 106). The medium response vector $\hat{g}$ is supplied to the combining weight generator 38 and the net response vector $\hat{h}$ is supplied to the both the combining weight generator 38 and metric calculator 40. The combining weight generator 38 computes the interference correlation matrix $R_I$ according to Equation (1.9) and the noise correlation matrix $R_N$ according to Equation (1.10) (block 108). Next, combining weight generator 38 determines the fitting parameters α and β (block 110) and computes the impairment covariance matrix R (block 112). The combining weight generator 38 may then compute the combining weights w based on the net response vector $\hat{h}$ and impairment covariance matrix R according to Equation (1.2) (block 114). Finally, the metric calculator computes the SIR for the multi-finger receiver mode according to Equation (1.1) (block 116). The single-finger receiver mode represents the classical RAKE (e.g., MRC) solution. The combining weight, net channel response, and impairment covariance are all scalar quantities. The net channel response for the single-finger mode is the element of the length J vector $\hat{h}$ that corresponds to the delay ($d_l$) reported by the path searcher. The combining weight is the complex conjugate of the net channel response. The impairment covariance is the element of the impairment covariance matrix R calculated for the multi-finger mode corresponding to the covariance of the delay reported by the path searcher with itself ($R(d_l,d_l)$). Equation (1.2) employs these quantities to determine the single-finger SIR. The multi-finger SIR is compared to the single-finger SIR to select the receiver mode.

In the case of the multi-finger receiver mode, multiple RAKE fingers 16 are placed around the delay of the dominant signal image, and different strategies may be employed to compute the SIR for this receiver mode. One strategy, referred to herein as the full order approach, treats the propagation path of the signal image as a dispersive channel with J paths and the receiver employs J=L RAKE fingers 16. In this case, the calculation of the SIR is straightforward if the path delays $\tau_l$ are assumed to be the same as the finger delays $d_j$. A second approach, referred to herein as the reduced order approach, assumes L paths for the propagation path of the dominant signal image and the receiver employs J>L RAKE fingers 16. In this case, the offsets between the finger delays $d_j$ and hypothesized path delays $\tau_l$ need to be determined. The finger delays $d_j$ are determined by centering a J finger grid at the peak reported by the delay searcher 32. The finger placement processor 34 then hypothesizes one or more path delays $\tau_l$ and determines the finger offsets $d_j-\tau_l$, for each set of the hypothesized path delays $\tau_l$. This process is equivalent to shifting the finger placement grid relative to the path delays. Thus, if a two-path model is used to model the propagation path of the dominant signal and three RAKE fingers 16 are used, each set of hypothesized path delays $\tau_l$ would result in six finger offsets, two for each RAKE finger 16. For each set of hypothesized path delays $\tau_l$, a metric is determined and the hypothesized set of path delays with the best metric is used to compute the SIR. The net response vector $\hat{h}$, impairment covariance matrix R, and combining weights w may then be computed as previously described.

Figure 7:
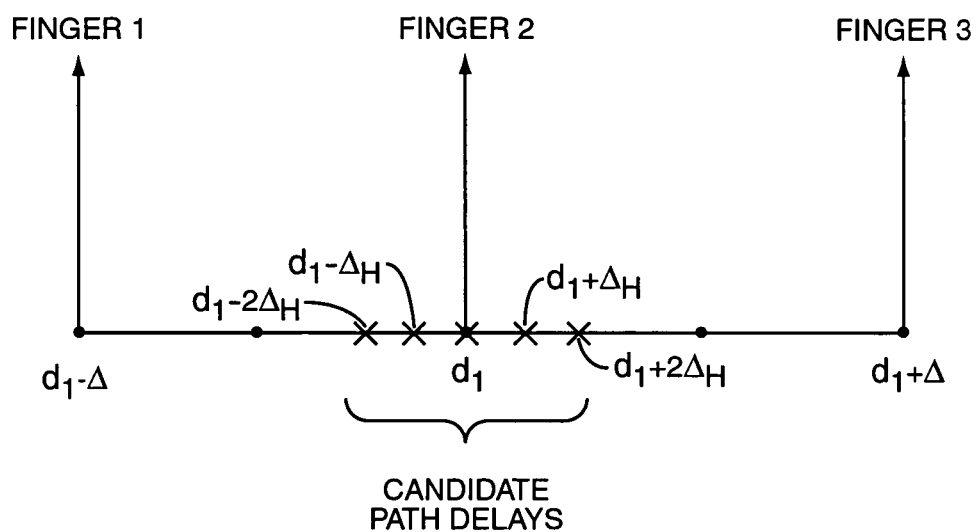
FIG. 7 illustrates a method of determining finger offsets from the path delay of a propagation channel.

To illustrate the reduced order channel model, assume that a single path model is used to model the propagation path of the dominant signal image and the receiver employs three RAKE fingers 16. The finger delays are denoted by $d_1$ for the middle finger 16, $d_1+\Delta$ for the finger 16 to the right of the middle finger 16, and $d_1-\Delta$ for the finger to the left of the middle finger 16. As shown in FIG. 7, a number of hypotheses for the location of the path delay $\tau_l$ are made, one corresponding to the delay $d_1$ reported by the path searcher 32 and the other hypothesized path delays are in units of $\pm\Delta_H$. A typical value for $\Delta_H$ is $$\frac{1}{16}$$

of the chip period. The hypothesized path delays are indicated by an x in FIG. 7. Thus, for N hypotheses for the path delay $\tau_l$, (N−1)/2 hypotheses at increments of $+\Delta_H$ are made and (N−1)/2 hypotheses at increments of $-\Delta_H$ are made. The set of finger offsets for each hypothesis is given by $\{d_1+\Delta-\tau_l, d_1-\tau_l, d_1-\Delta-\tau_l\}$.

Figure 8:
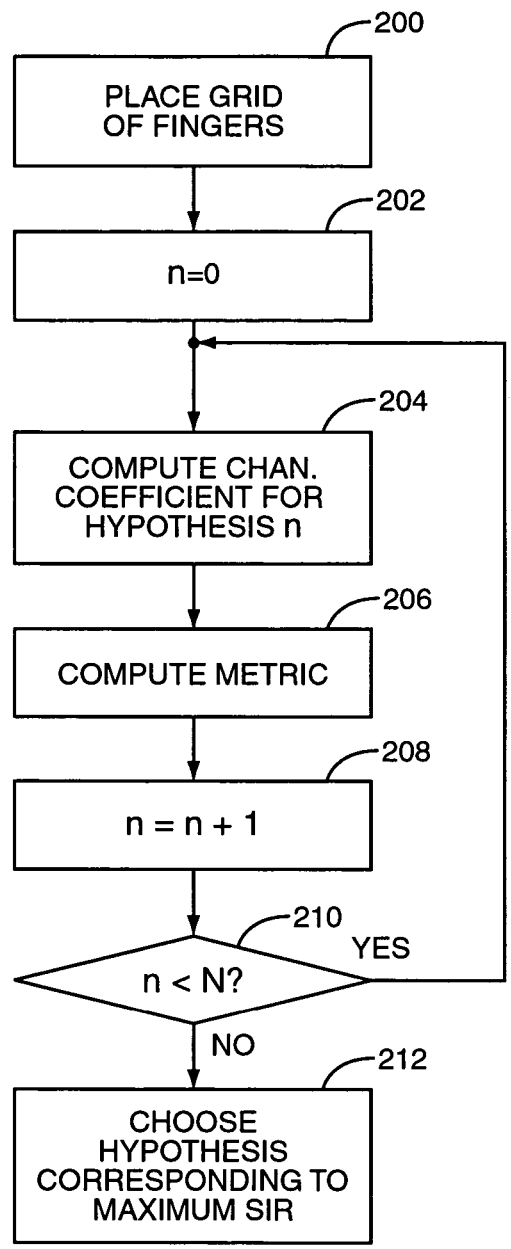
FIG. 8 is a flow diagram illustrating a first exemplary procedure for determining finger offsets from a path delay.

Various metrics may be used to evaluate hypothesized path delays and to select the best hypothesis. One approach estimates the channel coefficients and calculates a log-likelihood for each hypothesis. The hypothesis that minimizes the log-likelihood is selected. FIG. 8 illustrates this approach. Finger delays are determined by centering a finger grid at the peak in the PDP reported by the delay searcher 32 (block 200). A counter n is then initialized by setting the counter to 0 (block 202). Channel coefficients are generated for each hypothesis (block 204) and a log-likelihood metric is computed for each hypothesis (block 206). The log-likelihood metric is described in Bottomley et al., Optimizing the Performance of Limited Complexity RAKE Receivers, Proc. 48th IEEE Vehicle Technology Conf., Ottawa, Canada, May 1998, and in U.S. Pat. No. 6,839,378, which is incorporated herein by reference. Interpolation can be used to obtain despread values at non-sample positions. After determining the log-likelihood metric at block 206, the finger placement processor 34 increments the counter n (block 208) and compares the counter n to a desired number of hypotheses N (block 210). If n<N, the process is repeated for the next hypothesis. If n=N, the finger placement processor 34 selects the hypothesis that minimizes the log-likelihood metric (block 212). After selecting the best hypothesis for the multi-finger receiver mode, the SIR for the multi-finger receiver mode is then calculated as previously described and compared to the SIR for the single-finger receiver mode. The finger placement processor then selects the receiver mode that maximizes the SIR.

Figure 9:
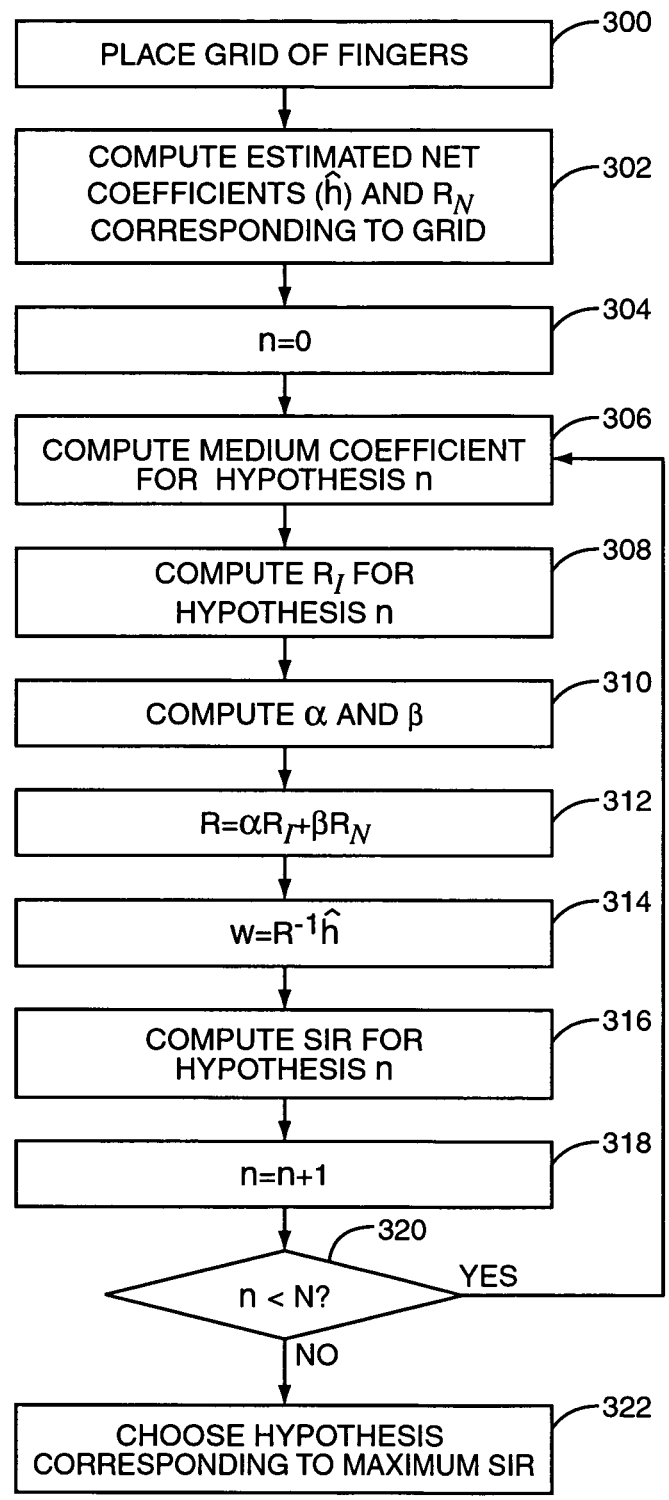
FIG. 9 is a flow diagram illustrating a second exemplary procedure for determining finger offsets from a path delay.

Another approach for choosing a hypothesized path delay is to use SIR as a metric to select the best hypothesis for the multi-finger receiver mode. FIG. 9 illustrates this approach. The finger delays are determined by centering a finger grid at the delay reported by the delay searcher 32 (block 300). The finger placement processor 34 then computes the net response vector $\hat{h}$ and noise correlation matrix $R_N$ (block 302). Note that the noise correlation matrix $R_N$ is independent of the hypothesized path delays. The finger placement processor 34 initializes a counter n by setting the counter n equal to 0 (block 304). The finger placement processor 34 then performs steps 306 through 316 for each hypothesis n. The finger placement processor 34 computes medium coefficients (block 306), interference correlation matrix $R_I$ (block 308), fitting parameters $\alpha$ and $\beta$ (block 310), impairment covariance matrix $\hat{R}$ (block 312), combining weights w (block 314), and SIR (block 316) for each hypothesis n. Because G-RAKE combining will be used, SIR simplifies to SIR=$\hat{h}^H w$. After the SIR is computed (block 316), the finger placement processor 34 increments the counter (block 318) and compares the counter to the desired number of hypotheses (block 320). If the desired number has not been reached, the finger placement processor 34 repeats blocks 306 through 316 until the desired number is reached. Once the desired number is reached, the finger placement processor 34 selects the hypothesis that maximizes the SIR (block 322). The finger placement processor 34 then compares the SIR for the hypothesis selected at block 322 and compares it to the SIR for the single-finger receiver mode and selects the receiver mode.

Figure 10:
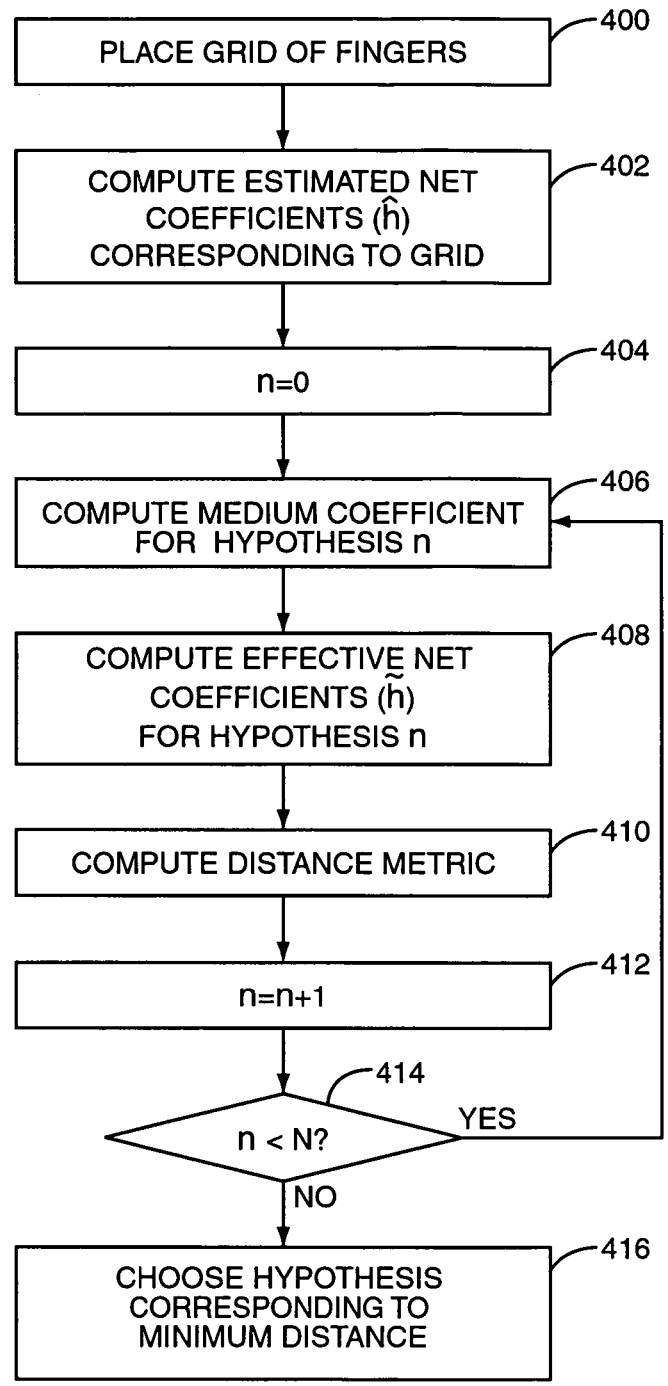
FIG. 10 is a flow diagram illustrating a third exemplary procedure for determining finger offsets from a path delay.

A third approach for selecting a hypothesized path delay for the multi-finger receiver mode is based on a distance metric. FIG. 10 illustrates this approach. The finger placement processor 34 determines the finger delays by centering a finger grid at the delay corresponding to the peak in the estimated PDP reported by the delay searcher 32 (block 400). The finger placement processor computes the net channel response vector $\hat{h}$ (block 402). Note that the net channel response vector $\hat{h}$ is a function of the finger grid and not the hypothesized path delays. The finger placement processor 34 initializes a counter n by setting it to 0 (block 404). The finger placement processor 34 then performs steps 406 through 410 for each of the n hypotheses. The finger placement processor 34 computes medium coefficients $\hat{g}_n$ for each RAKE finger 16 for each hypothesis (block 406), effective net coefficients $\tilde{h}_n$ for each RAKE finger (block 408), and a distance metric between the net channel response vector coefficients and the effective net channel response vector coefficients (block 410). The distance metric can be a Euclidean distance metric given by $(|\hat{h}-\tilde{h}_n|^2)$ or a distance metric that accounts for noise correlations given by $(\hat{h}-\tilde{h}_n)^H R^{-1}(\hat{h}-\tilde{h}_n)$. After computing the distance metric (block 410), the finger placement processor 34 increments the counter (block 412) and compares the counter to the desired number of hypotheses (block 414). If the desired number has not been reached, the finger placement processor 34 repeats blocks 406 through 410 until the desired number is reached. Once the desired number is reached, the finger placement processor 34 selects the hypothesis that minimizes the distance metric.

A variant of the Euclidean distance metric given above may be used to simplify the method shown in FIG. 10. The Euclidean distance may be computed according to $|\hat{h}^H y_i|^2$, where $y_i = r_i/\sqrt{r_i^T r_i}$, and $r_i = [r_{ff}(d_1+\Delta-\tau_l), r_{ff}(d_1-\tau_l), r_{ff}(d_1-\Delta-\tau_l)]^T$. Note that $y_i$ may be pre-computed for all delay offset hypotheses.

Regardless of which metric is used to determine the best hypothesized path delay for the multi-finger receiver mode, if a one-path model is assumed and the hypothesized path delay corresponds to a sample point, two of the RAKE fingers 16 may be discarded and a single RAKE finger 16 placed at the estimated path delay. If the estimated path delay is the same as the path delay for the single-finger receiver mode, there is no need to compare the two approaches. When the estimated path delay does not correspond to a sample position, the SIR for the multi-finger receiver mode should be compared to the SIR for the single-finger receiver mode to determine which approach to employ for demodulation.

While described in terms of a single path channel, the present invention may also be applied in a dispersive channel. For example, the mode selection method described above for selecting between a single-finger image receiver mode and multi-finger image receiver mode may be applied to only the strongest signal image, to all signal images, or to all signal images that meet a predetermined criteria. When applied in a multi-path channel, the computation of the SIR should take into account all of the assigned fingers. For example, if there is a two-path channel, and the receiver considers placing one or three fingers on the dominant path, the SIR would be determined by considering the one or three fingers for the dominant signal image in conjunction with the finger or assigned to the weaker path. The dominant path may be determined based on long-term averages or based on instantaneous fading values.

Figure 11:
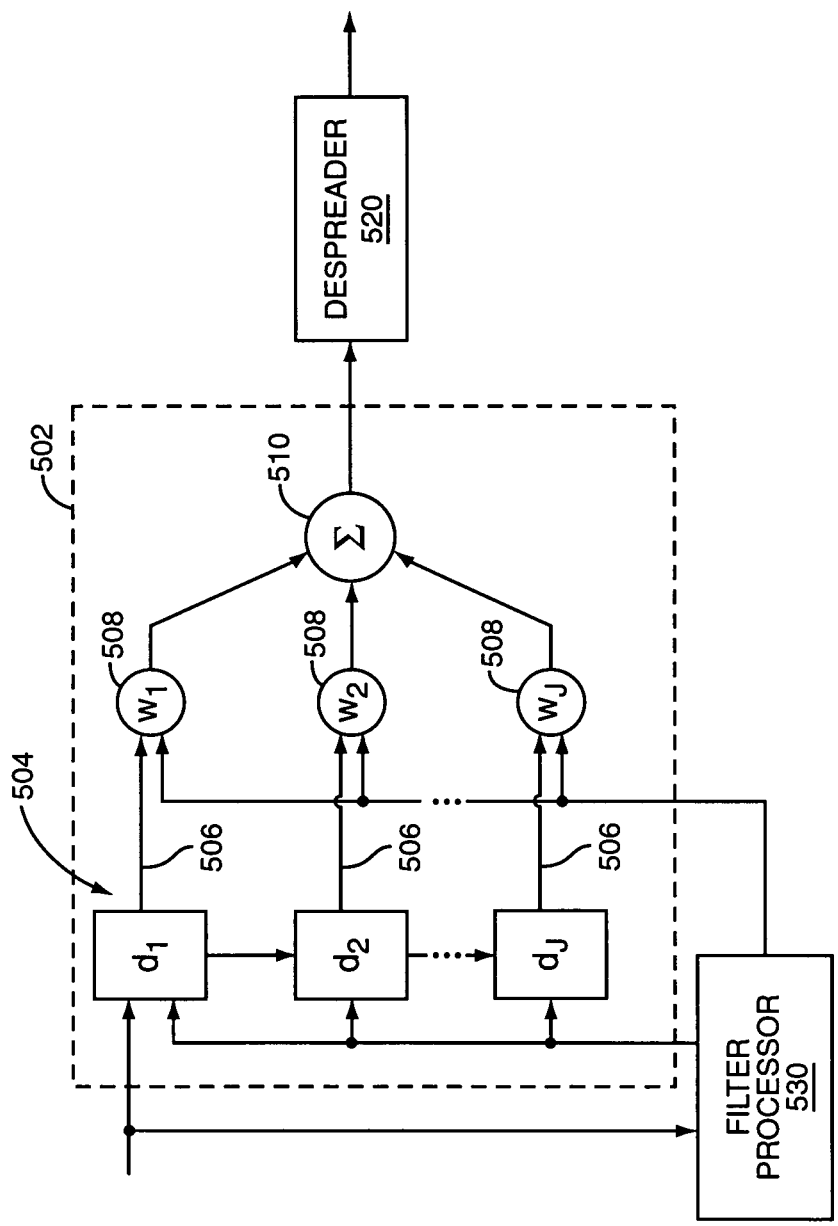
FIG. 11 illustrates an exemplary chip equalization receiver according to the present invention.

The above-described embodiments assume that the receiver is a RAKE receiver. Those skilled in the art will recognize that the present invention may also be applied to a chip equalization receiver. FIG. 11 illustrates a chip equalization receiver 500 according to one embodiment of the invention. The chip equalization receiver 500 comprises an equalizer filter 502, despreader 520, and filter processor 530. The equalizer filter 502 filters the received signal samples before despreading to generate a filtered signal. The equalizer filter 502 comprises an FIR filter comprising delay elements 504 with J taps 506. The tap outputs 506 may be weighted by weighting elements 508 and combined by a combiner 510. Alternatively, combiner 510 may combine the tap outputs 506 directly. The filtered signal is then despread by despreader 520. Filter processor 530 determines the tap delays and filter coefficients for the equalizer filter 502. The tap delays correspond to the previously discussed finger delays, and the filter coefficients correspond to the previously discussed combining weights. As with the RAKE receiver embodiment, the filter processor 530 determines the number J of taps for the equalizer filter based on evaluating a metric. Similarly, the filter processor 530 determines the filter coefficients for the J taps.

The present invention may also be extended to multiple receiver and/or transmit antennas. In the case of multiple receive antennas, the methods described above may be applied separately for each receive antenna. It may also be applied jointly, which would be useful under certain interference-limited situations, such as HSDPA, the high-speed downlink packet data mode of WCDMA. For example, assuming a single-path channel and two receive antennas, the receiver could compare four approaches:

1) placing one finger on antenna A and one finger on antenna B;
2) placing one finger on antenna A and three fingers on antenna B;
3) placing three fingers on antenna A and one finger on antenna B; and
4) placing three fingers on antenna A and three fingers on antenna B.

If the two antennas are sampled at the same time, then options 2 and 3 could be eliminated. If the sampling for each antenna is staggered, options 1 and 4 may be eliminated instead. When computing metrics for G-RAKE reception, joint SIR calculations based on both antennas may be used.

There are two scenarios for which multiple transmit antennas may be involved. One is soft handoff. In this case, finger placement may be determined separately for each transmitted signal. The other scenario is transmit diversity. In this case, the above-described methods may be applied separately for each transmitted signal or jointly for the transmitted signals based on the assumption that the path arrival times are the same. Details regarding weight formation and SIR computation for this scenario are described in U.S. patent application Ser. No. 10/800,167 filed Mar. 12, 2004.

In the exemplary embodiments described above, the selection of the receiver mode is made before demodulation. In other embodiments of the invention, metrics computed after multiple parallel demodulations may be considered. The demodulated signal that generates the best metric is then given to the decoder. Also, demodulation and decoding using the different approaches may be performed one at a time. If the first approach fails (e.g., an error detection code such as a CRC fails), then the second approach can be tried. If the selection of the receiver mode is made after demodulation but before decoding, selection can be based on a mean square error (MSE) measure. For example, if the two receiver modes are used in RAKE combining, the MSE for each receiver mode may be estimated by detecting the symbols, regenerating the desired RAKE combined signal, and examining the error between the regenerated signal and the RAKE combined signal.

To reduce processing load on the receiver, the present invention may be applied adaptively. For example, the mode selection method of the present invention may be applied only when there are a small number of signal paths, e.g., for example one. Additional criterion, such as the modulation scheme or data rate, can also be considered. The present invention may provide greater benefit for higher order modulation and high data rates. The data rate depends on modulation, spreading factor, and the number of multi-codes used. For example, the methods described above may be applied if the delay searcher 32 finds only one path and the ratio of the number of multi-codes to the spreading factor is greater than one-half.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

We claim:

1. A method of determining operating modes in a receiver for demodulating a signal, comprising:
   receiving the signal at said receiver;
   identifying a signal image in the received signal;
   determining a first signal quality metric for a single-delay receiver mode in which the signal image is processed using a single delay;
   determining a second signal quality metric for a multi-delay receiver mode in which the signal image is processed using multiple delays; and
   selecting the single-delay receiver mode or the multi-delay receiver mode based on a comparison of said first and second signal quality metrics.

2. The method of claim 1 wherein identifying the signal image comprises generating a power delay profile and detecting a local maxima in the power delay profile.

3. The method of claim 2 wherein the receiver comprises one of a RAKE receiver and a chip equalization receiver, and wherein said single-delay receiver mode comprises placement of a single RAKE finger of the RAKE receiver or a single delay tap of the chip equalization receiver at a delay corresponding to said local maxima.

4. The method of claim 2 wherein the receiver comprises one of a RAKE receiver and a chip equalization receiver, and wherein said multi-delay receiver mode comprises placement of multiple RAKE fingers of the RAKE receiver or multiple delay taps of the chip equalization receiver at respective delays proximate said local maxima.

5. The method of claim 1 wherein the second signal quality metric for the multi-delay receiver mode is based on a full-order model of the signal image comprising a number of path delays equal to the number of delays used in the multi-delay receiver mode.

6. The method of claim 1 wherein the second signal quality metric is based on a reduced order model of the signal image comprising a number of path delays less than a number of delays used in the multi-delay receiver mode.

7. The method of claim 6 wherein determining a second signal quality metric for a multi-delay receiver mode comprises:
hypothesizing two or more sets of path delays;
computing a metric for each set of hypothesized path delays;
selecting the set of hypothesized path delays based on the metric; and
computing the second signal quality metric using the selected set of hypothesized path delays.

8. The method of claim 1 wherein said first and second signal quality metrics comprise signal-to-interference ratios.

9. The method of claim 1 further comprising decoding the received signal using the selected receiver mode.

10. The method of claim 9 further comprising decoding the received signal a second time using a second receiver mode responsive to a decoding failure.

11. The method of claim 1 wherein the mode selection for the receiver mode is selectively enabled and disabled.

12. The method of claim 11 wherein the mode selection for the receiver mode is enabled only for non-dispersive channels.

13. The method of claim 11 wherein the mode selection is enabled for selected data rates.

14. The method of claim 11 wherein the mode selection is enabled for selected modulation formats.

15. The method of claim 1 wherein mode selection is performed separately for a plurality of received signals received by different receive antennas.

16. The method of claim 1 wherein mode selection is performed jointly for a plurality of received signals received by different receive antennas.

17. The method of claim 1 wherein mode selection is performed separately for one or more received signals transmitted by one or more different transmit antennas.

18. The method of claim 1 wherein mode selection is performed jointly for one or more received signals transmitted by one or more different transmit antennas.

19. The method of claim 1 wherein the receiver comprises a RAKE receiver that RAKE combines despread values using the selected receiver mode.

20. The method of claim 19 wherein said first and second signal quality metrics are computed before RAKE combining.

21. The method of claim 19 wherein said single-delay receiver mode and said multi-delay receiver mode comprises a single-finger receiver mode and a multi-finger receiver mode for the RAKE receiver.

22. The method of claim 21 wherein said first and second signal quality metrics are computed after RAKE combining in the single-delay and multi-delay receiver modes.

23. The method of claim 22 wherein the received signal is RAKE combined in parallel in the single-finger and multi-finger receiver modes, and wherein the signal quality metric is used to select a RAKE combined symbol estimate for decoding.

24. The method of claim 19 wherein the RAKE receiver is a generalized RAKE receiver that combines signal images using combining weights determined as a function of impairment correlations across RAKE fingers.

25. The method of claim 1 wherein the receiver comprises a chip equalization receiver, and wherein the single-delay receiver mode and the multi-delay receiver mode comprise a single-tap receiver mode and a multi-tap receiver mode, respectively.

26. A receiver for demodulating a received signal containing one or more signal images, said receiver comprising;
a delay searcher configured to detect a signal image in the received signal;
a processor operative to:
determine a first signal quality metric for a single-delay receiver mode in which the signal image is processed using a single delay;
determine a second signal quality metric for a multi-delay receiver mode in which the signal image is processed using multiple delays; and
select the single-delay receiver mode or the multi-delay receiver mode based on a comparison of said first and second signal quality metrics.

27. The receiver of claim 26 wherein the delay searcher is configured to identify the signal image by generating a power delay profile and to detect a local maxima in the power delay profile, 28. The receiver of claim 27 wherein the receiver comprises one of a RAKE receiver and a chip equalization receiver, and wherein said single-delay receiver mode comprises placement of a single RAKE finger of the RAKE receiver or delay tap of the chip equalization receiver at a delay corresponding to said local maxima.

29. The receiver of claim 27 wherein the receiver comprises one of a RAKE receiver and a chip equalization receiver, and wherein said multi-delay receiver mode comprises placement of multiple RAKE fingers of the RAKE receiver or multiple delay taps of the chip equalization receiver at respective delays proximate said local maxima.

30. The receiver of claim 26 wherein the processor is configured to determine the second signal quality metric for the multi-delay receiver mode based on a full-order model of the signal image comprising a number of path delays equal to the number of delays used in the multi-delay receiver mode.

31. The receiver of claim 26 wherein the processor is configured to determine the second signal quality metric based on a reduced order model of the signal image comprising a number of path delays less than the number of delays used in the multi-delay receiver mode.

32. The receiver of claim 31 wherein the processor is configured to determine a second signal quality metric for a multi-delay receiver mode by:
hypothesizing two or more sets of path delays;
computing a metric for each set of hypothesized path delays;
selecting the set of hypothesized path delays based on the metric; and
computing the second signal quality metric using the selected set of hypothesized path delays.

33. The receiver of claim 26 wherein said first and second signal quality metrics comprise signal-to-interference ratios.

34. The receiver of claim 26 wherein the processor is configured to selectively enable and disable mode selection for the receiver mode.

35. The receiver of claim 34 wherein the processor is configured to enable mode selection for the receiver mode only for non-dispersive channels.

36. The receiver of claim 34 wherein the processor is configured to enable mode selection for selected data rates.

37. The receiver of claim 34 wherein the processor is configured to enable mode selection for selected modulation formats.

38. The receiver of claim 26 wherein the processor is configured to perform mode selection separately for a plurality of received signals received by different receive antennas.

39. The receiver of claim 26 wherein the processor is configured to perform mode selection jointly for a plurality of received signals received by different receive antennas.

40. The receiver of claim 26 wherein the processor is configured to perform mode selection separately for one or more received signals transmitted by one or more different transmit antennas.

41. The receiver of claim 26 wherein the processor is configured to perform mode selection jointly for one or more received signals transmitted by one or more different transmit antennas.

42. The receiver of claim 26 wherein the receiver comprises a RAKE receiver configured to RAKE combine despread values using the selected receiver mode, and wherein the processor comprises a finger placement processor.

43. The receiver of claim 42 wherein the receiver is configured to decode the received signal a second time using a second receiver mode responsive to a decoding failure.

44. The receiver of claim 42 wherein the finger placement processor is configured to determine the first and second signal quality metrics before RAKE combining.

45. The receiver of claim 42 wherein the finger placement processor is configured to determine the first and second signal quality metrics after RAKE combining in the single-delay and multi-delay receiver modes.

46. The receiver of claim 45 wherein the RAKE receiver RAKE is configured to combine the single-delay and multi-delay receiver modes in parallel, and wherein the finger placement processor is configured to select a combined symbol estimate for decoding based on the signal quality metric.

47. The receiver of claim 42 wherein the RAKE receiver is a generalized RAKE receiver that is configured to combine signal images using combining weights determined as a function of impairment correlations across RAKE fingers.

48. The receiver of claim 26 wherein the receiver comprise a chip equalization receiver, wherein the processor comprises a filter processor, and wherein the chip equalization receiver further includes an equalization filter configured to filter the received signal using one or more tap delays.

* * * * *

UNITED STATES PATENT AND TRADEMARK OFFICE
CERTIFICATE OF CORRECTION

| | | |
|---|---|---|
| PATENT NO. | : 8,964,912 B2 | Page 1 of 1 |
| APPLICATION NO. | : 11/219183 | |
| DATED | : February 24, 2015 | |
| INVENTOR(S) | : Cairns et al. | |

It is certified that error appears in the above-identified patent and that said Letters Patent is hereby corrected as shown below:

Specification

In Column 7, Line 44, delete "α0" and insert -- α --, therefor.

In Column 10, Line 41, delete "$(\hat{h} - \tilde{h}_n)$" and insert -- $(\hat{h} - \tilde{h}_n).$ --, therefor.

Claims

In Column 14, Line 14, in Claim 26, delete ""comprising;" and insert -- comprising: --, therefor.

In Column 14, Line 30, in Claim 27, delete "profile," and insert -- profile. --, therefor.

Signed and Sealed this
Sixth Day of October, 2015

Michelle K. Lee
*Director of the United States Patent and Trademark Office*